(12) United States Patent
Heilman et al.

(10) Patent No.: US 12,651,805 B2
(45) Date of Patent: Jun. 9, 2026

(54) INTERCONNECT BOARD FRAME FOR A BATTERY MODULE

(71) Applicant: GM Global Technology Operations LLC, Detroit, MI (US)

(72) Inventors: Christopher Paul Heilman, Waterford, MI (US); Hayley E. Hunt, West Bloomfield, MI (US); Samir Orow, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 499 days.

(21) Appl. No.: 18/480,823

(22) Filed: Oct. 4, 2023

(65) Prior Publication Data

US 2025/0118866 A1      Apr. 10, 2025

(51) Int. Cl.
| | |
|---|---|
| *H01M 50/503* | (2021.01) |
| *H01M 50/209* | (2021.01) |
| *H01M 50/249* | (2021.01) |
| *H01M 50/507* | (2021.01) |
| *H01M 50/51* | (2021.01) |

(52) U.S. Cl.
CPC ....... *H01M 50/503* (2021.01); *H01M 50/209* (2021.01); *H01M 50/249* (2021.01); *H01M 50/507* (2021.01); *H01M 50/51* (2021.01); *H01M 2220/20* (2013.01)

(58) Field of Classification Search
CPC ............. H01M 50/503; H01M 50/249; H01M 50/209; H01M 50/507; H01M 50/51; H01M 2220/20
See application file for complete search history.

(56) References Cited

U.S. PATENT DOCUMENTS

2019/0334154 A1* 10/2019 Bollmann ........... H01M 50/284

FOREIGN PATENT DOCUMENTS

DE       102017200311 A1     7/2018

* cited by examiner

*Primary Examiner* — Mayla Gonzalez Ramos
(74) *Attorney, Agent, or Firm* — Vivacqua Crane, PLLC

(57)      ABSTRACT

An interconnect board frame for a battery module, the battery module having at least a first battery cell having a positive terminal and a negative terminal, includes a first frame member defining a first slot aligned with the positive terminal of the first battery cell, a second frame member connected to the first frame member, the second frame member defining a second slot aligned with the negative terminal of the first battery cell, and a puzzle joint defined by the connection of the first frame member and the second frame member, wherein the puzzle joint extends between the first slot and the second slot across a series connection between battery cells.

20 Claims, 6 Drawing Sheets

INTERCONNECT BOARD FRAME FOR A BATTERY MODULE

The present disclosure relates to an interconnect board (ICB) frame for a battery module. More particularly, the present disclosure relates to an ICB frame having frame members connected together at a puzzle joint between a series connection of battery cells within the battery module.

Electric vehicles and hybrid vehicles employ a high voltage electric battery system that includes a number of battery cells, typically packaged as multiple battery modules within a battery pack. The battery pack is often located under the vehicle body midway between the front and rear wheels. These electric and hybrid vehicles typically require several battery modules to provide enough power to meet vehicle power and energy requirements. Power and/or range requirements may lead to battery modules having increased length to accommodate enough battery cells to meet these requirements. This in turn leads to components within the battery module, such as board frames used to locate and support busbars connected to the battery cells, to have increased length. Increased length of board frames may lead to challenges for assembly, shipment, and manufacturing.

Therefore, there is a need in the art for improved board frames that accommodate all battery module sizes.

SUMMARY

An interconnect board frame for a battery module is provided. The battery module includes at least a first battery cell having a positive terminal and a negative terminal. The interconnect board frame includes a first frame member defining a first slot aligned with the positive terminal of the first battery cell, a second frame member connected to the first frame member, the second frame member defining a second slot aligned with the negative terminal of the first battery cell, and a puzzle joint defined by the connection of the first frame member and the second frame member, wherein the puzzle joint extends between the first slot and the second slot.

In one aspect, a retention feature is disposed on the first frame member and the second frame member, wherein the retention feature secures the first frame member with the second frame member in all directions.

In another aspect, the retention feature includes a snap connector connected to the first frame member and a hole disposed in the second frame member, wherein the snap connector is disposed within the hole.

In another aspect, the interconnect board frame has a length and a width, and the puzzle joint extends across the width.

In another aspect, the puzzle joint includes a first crosswise portion connected to a lengthwise portion connected to a second crosswise portion, wherein the first crosswise portion is adjacent the first slot, the second crosswise portion is adjacent the second slot, and the lengthwise portion is disposed between the first slot and the second slot.

In another aspect, the lengthwise portion is perpendicular to the first crosswise portion and the second crosswise portion.

In another aspect, the puzzle joint is separated from the first slot and the second slot.

In another aspect, the first slot includes a first window extending therethrough, and the second slot includes a second window extending therethrough.

In another aspect, the first slot is offset along a width from the second slot.

In another embodiment, a battery module is provided. The battery module includes a first battery cell having a positive terminal and a negative terminal, an interconnect board (ICB) frame disposed on the first battery cell, the ICB frame including a first frame member defining a first slot aligned with the positive terminal of the first battery cell, a second frame member connected to the first frame member, the second frame member defining a second slot aligned with the negative terminal of the first battery cell, and a puzzle joint defined by the connection of the first frame member and the second frame member, wherein the puzzle joint extends between the first slot and the second slot.

In one aspect, a plurality of busbars are disposed within one of the first slot and the second slot.

In another aspect, the first slot includes a first window extending therethrough, and the second slot includes a second window extending therethrough, and the busbars are connected to the positive terminal and the negative terminal through the first window and the second window.

In another aspect, a retention feature is disposed on the first frame member and the second frame member, wherein the retention feature secures the first frame member with the second frame member in all directions.

In another aspect, the retention feature includes a snap connector connected to one of the first frame member and the second frame member and a hole disposed in the other of the first frame member and the second frame member, wherein the snap connector is disposed within the hole.

In another aspect, the puzzle joint includes a first crosswise portion connected to a lengthwise portion connected to a second crosswise portion, wherein the first crosswise portion is adjacent the first slot, the second crosswise portion is adjacent the second slot, and the lengthwise portion is disposed between the first slot and the second slot.

In another aspect, the lengthwise portion is perpendicular to the first crosswise portion and the second crosswise portion.

In another embodiment, a battery module for a vehicle is provided. The battery module includes a plurality of battery cells, a plurality of busbars connected to the plurality of battery cells, wherein the battery cells are connected in series by the plurality of busbars, an interconnect board (ICB) frame disposed between the plurality of battery cells and the plurality of busbars, the ICB frame including a first frame member defining a plurality of first slots aligned with positive terminals or negative terminals of the plurality of battery cells, a second frame member connected to the first frame member, the second frame member defining a plurality of second slots aligned with the positive terminal or negative terminals of the plurality of battery cells, and wherein the first frame connects to the second frame member across one of the series connections between the plurality of battery cells.

In one aspect, the plurality of first slots and the plurality of second slots are each disposed in two rows along a length of the ICB frame.

In another aspect, a retention feature is disposed on the first frame member and the second frame member, wherein the retention feature secures the first frame member with the second frame member in all directions.

In another aspect, the retention feature includes a snap connector connected to one of the first frame member and the second frame member and a hole disposed in the other of the first frame member and the second frame member, wherein the snap connector is disposed within the hole.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
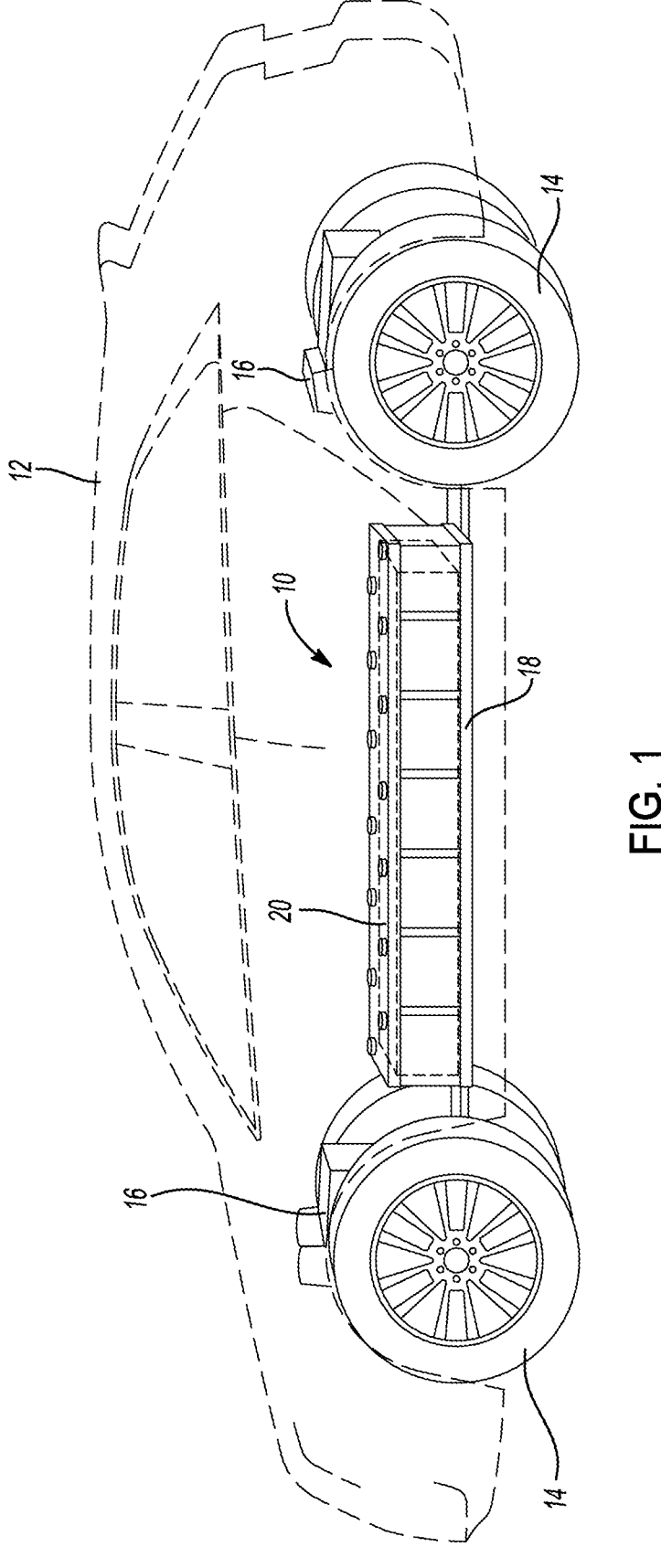
FIG. 1 is schematic view of an exemplary motor vehicle having a battery pack and an interconnect board frame according to the principles of the present disclosure.

Referring to FIG. 1, a battery pack 10 having an interconnected board frame (discussed in greater detail below) according to the principles of the present disclosure is shown. The battery pack 10 is illustrated with an exemplary vehicle 12. The vehicle 12 is preferably an electric vehicle or hybrid vehicle having wheels 14 driven by electric motors/inverters 16. The electric motors/inverters 16 receive motive power from the battery pack 10. While the vehicle 12 is illustrated as a passenger road vehicle, it should be appreciated that the battery pack 10 may be used with various other types of vehicles. For example, the battery pack 10 may be used in nautical vehicles, such as boats, or aeronautical vehicles, such as drones or passenger airplanes. Moreover, the battery pack 10 may be used as a stationary power source separate and independent from a vehicle. The battery pack 10 generally includes a battery tray 18 connected to the vehicle 12. The battery tray 18 provides structural support to one or a plurality of battery modules 20. The battery pack 10 may further include a battery thermal management system and battery management system (not shown).

Figure 2:
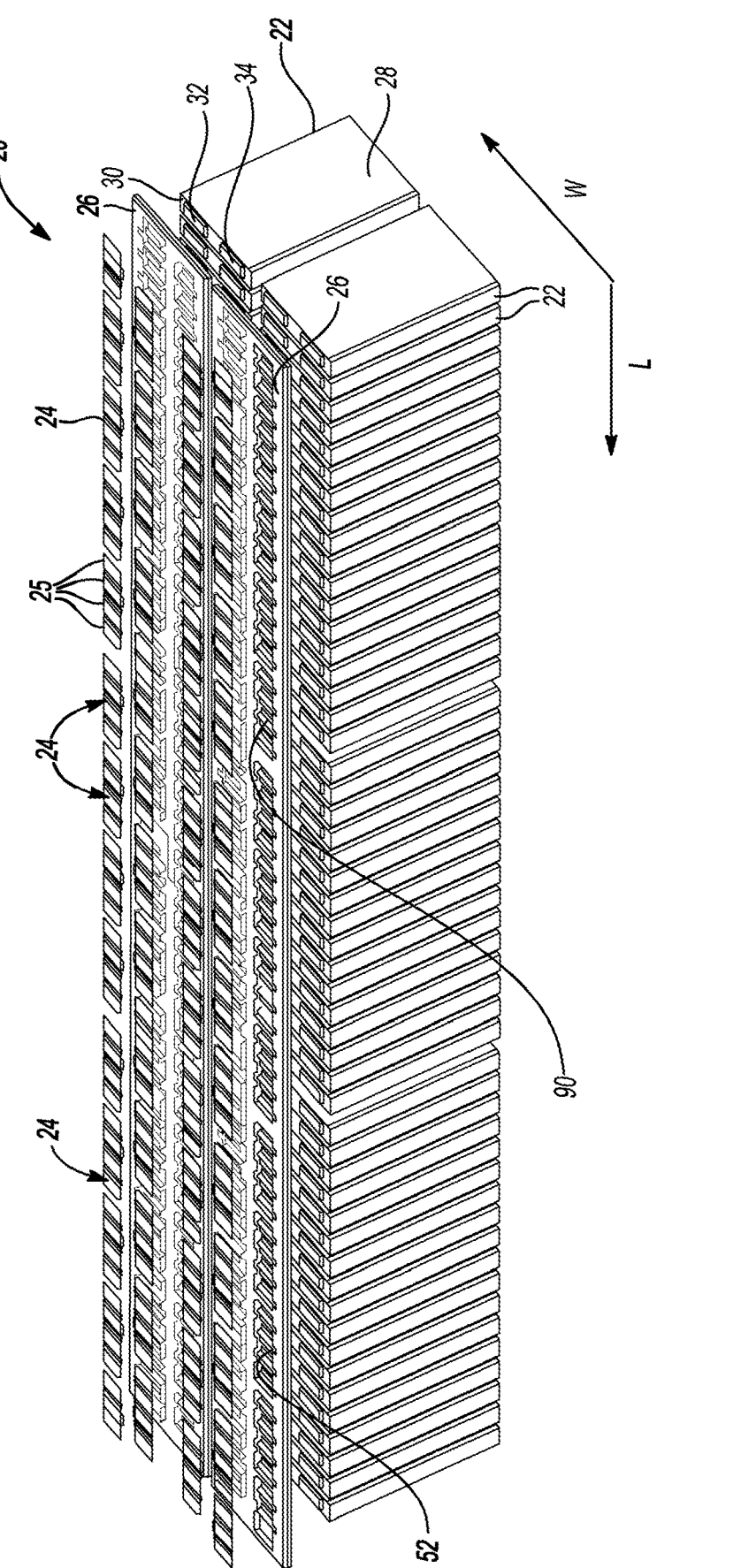
FIG. 2 is a perspective, exploded view of a battery module within the battery pack having the interconnect board frame.

Turning to FIG. 2, the battery module 20 generally includes a plurality of battery cells 22, a plurality of busbars 24, and a pair of interconnect board (ICB) frames 26. The battery cells 22, the busbars 24, and the ICB frames 26 may be stored within a housing (not shown). The battery module 20 is oriented to have a row of battery cells 22 extending along a length 'L' and one or more rows of battery cells 22 disposed along a width 'W'. While two rows of battery cells 22 each with multiple battery cells 22 and two ICB frames 26 are illustrated, it should be appreciated that any number of battery cells 22, busbars 24, and ICB frames 26 may be employed within the battery module 20 without departing from the scope of the present disclosure.

The battery cells 22 are lithium-ion battery cells. However, it should be appreciated that any type of battery cell 22 may be employed. In addition, the battery cells 22 may be cylindrical battery cells, prismatic can battery cells, or pouch battery cells. Generally, the battery cells 22 each include a casing 28 having a top surface 30. A positive terminal 32 and a negative terminal 34 are disposed on the top surface 30. The negative terminal 34 is connected to an anode current collector (not shown) within the battery cell 22. The positive terminal 32 is connected to a cathode current collector (not shown) within the battery cell 22.

The busbars 24 are electrical conductors used to connect individual battery cells 22 in series or parallel. The busbars 24 each generally include a number of contact pads 25. In the example provided, the busbar 24 includes four contact pads 25. The busbars 24 are laser welded (or otherwise fixedly connected) at the contact pads 25 to the positive terminals 32 and negative terminals 34 of the battery cells 22. The configuration of the busbars 24 and the orientation of the battery cells 22 determine the series and parallel connections therebetween.

Figure 3:
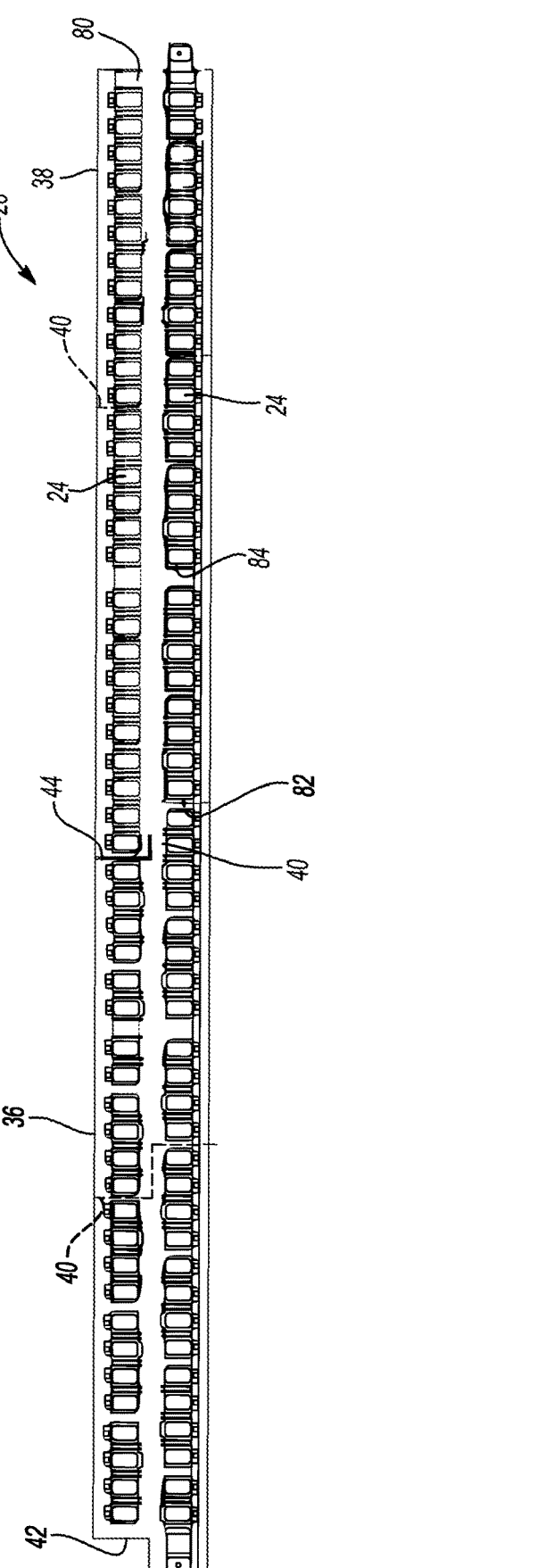
FIG. 3 is a top view of the interconnect board frame.
Figure 4:
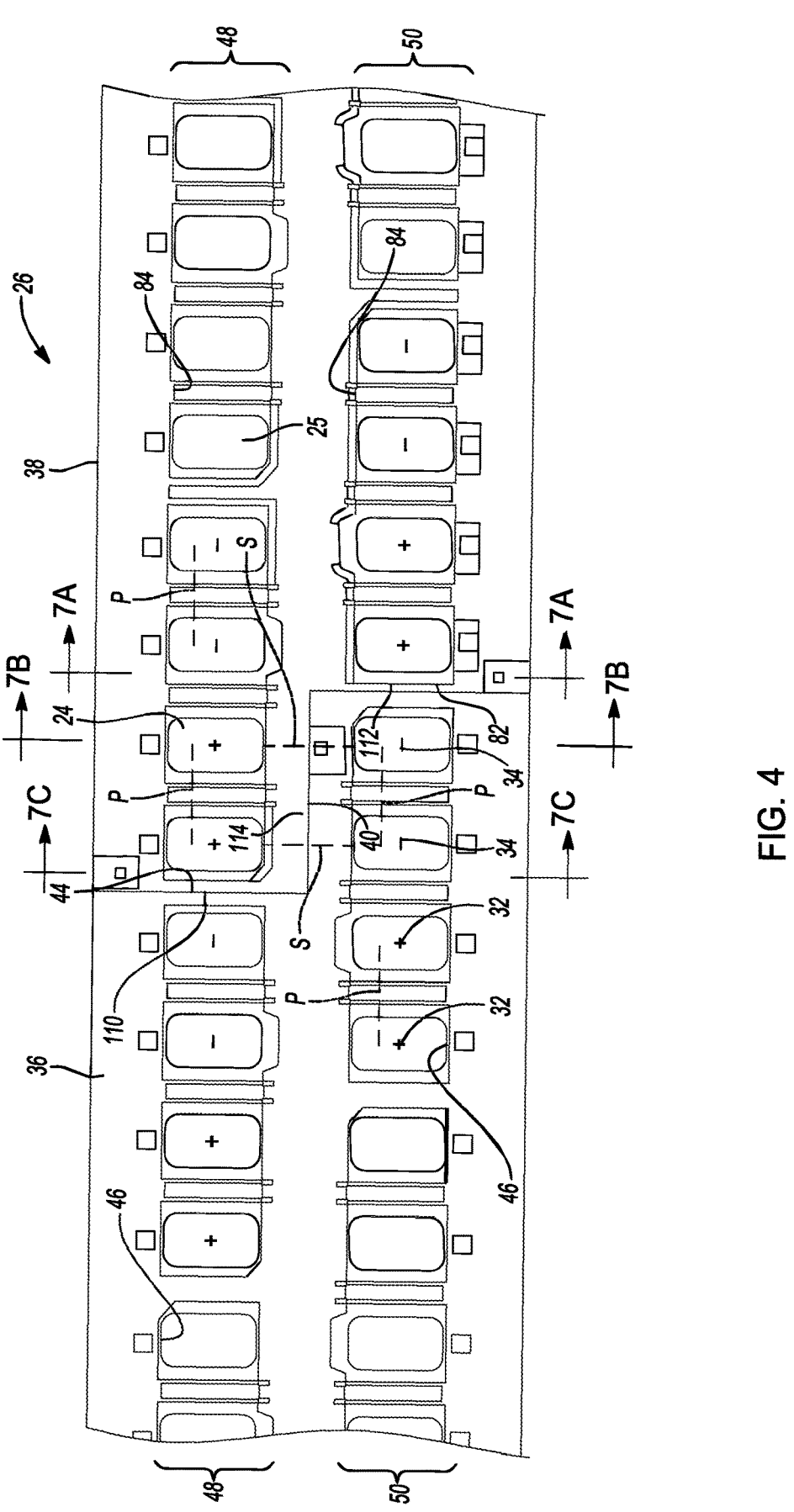
FIG. 4 is a top, enlarged view of a portion of the interconnect board frame.

FIGS. 3 and 4 illustrate the ICB frame 26 with a plurality of the busbars 24. The ICB frame 26 is configured to locate and hold the busbars 24 relative to the battery cells 22 during assembly. The ICB frame 26 is preferably formed of a plastic. The ICB frame 26 is disposed between the busbars 24 and the battery cells 22 along the length of the battery module 20 with one ICB frame 26 per one row of battery cells 22. The ICB frame 26 generally includes a first frame member 36 connected to a second frame member 38 at a puzzle joint 40. While only one puzzle joint 40 is illustrated, the ICB frame 26 may include more than one puzzle joint 40 (illustrated in FIG. 3 with dashed lines) in order to divide up the ICB frame 26 into a plurality of frame members. The location and design of the puzzle joint 40 allows the ICB frame 26 to be manufactured, shipped, and installed as shorter frame members or as modules without requiring additional components or busbars, as will be described in greater detail below.

The first frame member 38 includes a first distal end 42 and an insert end 44 opposite the first distal end 42. The first frame member 36 also includes a plurality of first slots 46 formed therein. The first slots 46 are organized into two rows 48, 50. The first slots 46 in each of the rows 48, 50 are offset from one another along the length of the battery module 20. Each of the first slots 46 is defined by a plurality of first windows 52 that extend through the first frame member 38, as best seen in FIG. 2. The first windows 52 are each aligned with one positive terminal 32 or negative terminal 34 on one battery cell 22. Each of the first slots 46 may include any number of first windows 52. In the example provided, the first slots 46 include four windows 52. The types of terminals and the number of battery cells 22 associated with the first slots 46 may vary. In the example provided, each first slot 46 is aligned with two positive terminals 32 and two negative terminals 34 (indicated schematically in FIG. 4 with "+" and "−" symbols) among four battery cells 22.

The first slots 46 are each sized to receive and hold a busbar 24. Each of the first windows 52 is sized to receive a contact pad 25 of a respective busbar 24 therein. Therefore, in the example provided, the battery cells 22 are connected in series (indicated by dashed line "S") and in parallel (indicated by dashed line "P").

Figures 5, 6:
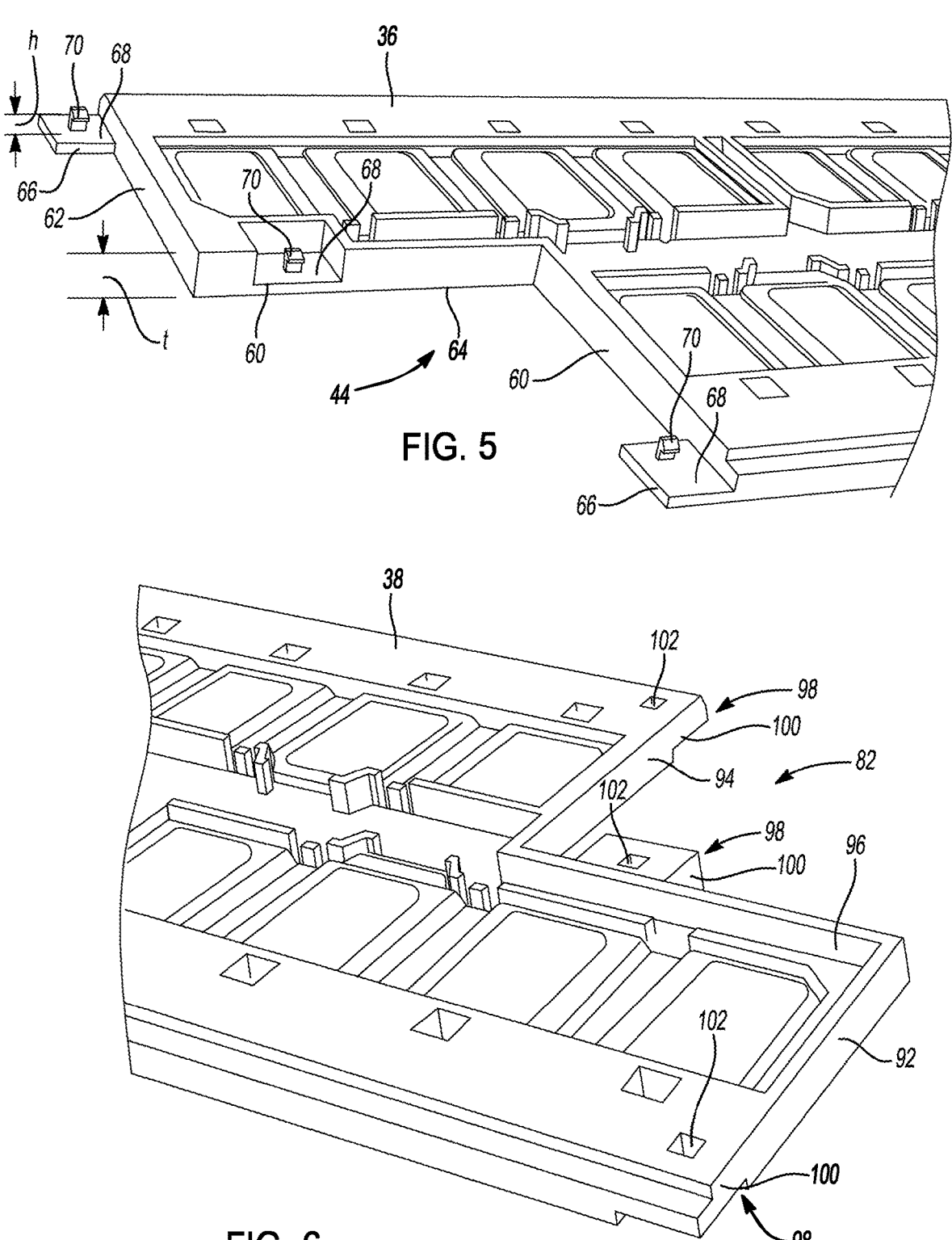
FIG. 5 is a perspective view of an end of a first frame member of the interconnect board frame.
FIG. 6 is a perspective view of an end of a second frame member of the interconnect board frame.

Turning to FIG. 5, the insert end 44 of the first frame member 36 includes two crosswise edges 60, 62 and one lengthwise edge 64. The crosswise edges 60, 62 are disposed perpendicular to the lengthwise edge 64. Each of the edges 60, 62, and 64 include an insert retention feature 66. The insert retention feature 66 includes a tab 68 and a snap connector 70 extending from the tab 68. A height "h" of the tab 68 and the snap connector 70 does not exceed a thickness "t" of the first frame member 36.

Returning to FIGS. 3-4, the second frame member 38 includes a second distal end 80 and receiving end 82 opposite the second distal end 80. The second frame member 38 also includes a plurality of second slots 84 formed therein. The second slots 84 are organized into the two rows 48, 50. The second slots 84 in each of the rows 48, 50 are offset from one another along the length of the battery module 20. Each of the second slots 84 is defined by a plurality of second windows 90 that extend through the second frame member 38, as best seen in FIG. 2. The second windows 90 are each aligned with one positive terminal 32 or negative terminal 34 on one battery cell 22. Each of the second slots 84 may include any number of second windows 90. In the example provided, the second slots 84 include four second windows 90. The types of terminals and the number of battery cells 22 associated with the second slots 84 may vary. In the example provided, each second slot 84 is aligned with two positive terminals 32 and two negative terminals 34 (indicated schematically in FIG. 4 with "+" and "−" symbols) among four battery cells 22.

The second slots 84 are each sized to receive and hold a busbar 24. Each of the second windows 90 is sized to receive a contact pad 25 of a respective busbar 24 therein. Therefore, in the example provided, the battery cells 22 are connected in series (indicated by dashed line "S") and in parallel (indicated by dashed line "P").

Figures 7A, 7B, 7C:
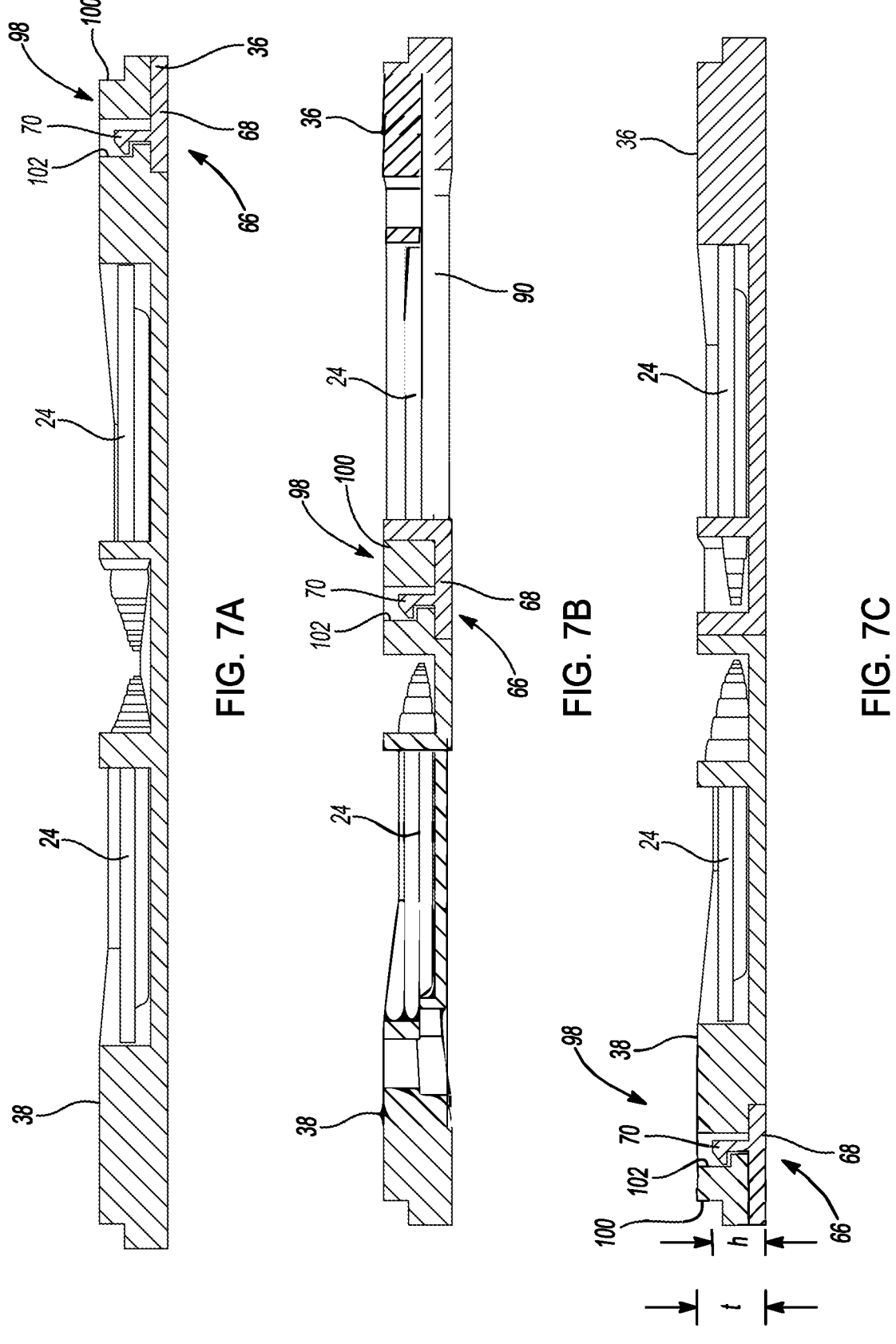
FIG. 7A is a cross-sectional view of the interconnect board frame viewed in the direction of arrows 7A-7A in FIG. 4.
FIG. 7B is a cross-sectional view of the interconnect board frame viewed in the direction of arrows 7B-7B in FIG. 4.
FIG. 7C is a cross-sectional view of the interconnect board frame viewed in the direction of arrows 7C-7C in FIG. 4.

Turning to FIG. 6, the receiving end 44 of the second frame member 38 includes two crosswise edges 92, 94 and one lengthwise edge 96. The crosswise edges 92, 94 are disposed perpendicular to the lengthwise edge 96. Each of the edges 92, 94, 96 include a receiving retention feature 98. Each of the receiving retention features 98 includes a housing 100 for receiving one of the tabs 68 (FIG. 5) and a hole 102 sized to receive one of the snap connectors 70 (FIG. 5) of the first frame member 36. FIGS. 7A-7C illustrate the interaction between the retention features 66, 98. The retention features 66, 98 secure the first frame member 36 to the second frame member 38 in all directions. In addition, due to each frame feature 36, 38 having either an insert retention feature 66 or a receiving retention feature 98, error during assembly is reduced.

Returning to FIG. 4, the puzzle joint 40 is the interface between the insert end 44 of the first frame member 36 and the receiving end 82 of the second frame member 38. The puzzle joint 40 is located between a series connection S and not between a parallel connection P. Therefore, the puzzle joint 40 is separated from the first slots 46 and the second slots 84. The puzzle joint 40 is characterized as having a first crosswise portion 110, a second crosswise portion 112, and a lengthwise portion 114. The first crosswise portion 110 and second crosswise portion 112 are perpendicular to the lengthwise portion 114. The first crosswise portion is disposed between one of the first slots 46 and one of the second slots 84 in the same row 48. The second crosswise portion 112 is disposed between one of the first slots 46 and one of the second slots 84 in the same row 50. The lengthwise portion 114 is disposed between one of the first slots 46 in one row 50 and one of the second slots 84 in the other row

48. Thus, the puzzle joint 40 cuts across series connections between battery cells 22 and not parallel connections.

The ICB frame 26 having the puzzle joint 40 and retention features 66, 98 provides many benefits, including eliminating the need for internal connections between busbars 24 due to puzzle joints located between parallel connections of the battery cells 22. The retention features 66, 98 ensure retention in all axes (i.e., directions) thus ensuring the first frame member 36 is secured to the second frame member 38. In addition, because the retention features 66, 98 have a height less than a thickness of the ICB frame 26, the packaging of the ICB frame 26 is not increased. The ICB frame 26 with the puzzle joint 40 reduces cycle time at manufacturing plants during installation, provides error proofing and sequenced operations during installation (i.e., first frame member 36 cannot connect to another first frame member 36), and enables receiving the ICB frame 26 as one assembly with no loose pieces, and allows for long battery modules 20 (for example, modules approximately fifty four battery cells in length).

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An interconnect board frame for a battery module, the battery module having at least a first battery cell having a positive terminal and a negative terminal, the interconnect board frame comprising:

a first frame member defining a first slot aligned with the positive terminal of the first battery cell;

a second frame member connected to the first frame member, the second frame member defining a second slot aligned with the negative terminal of the first battery cell; and a puzzle joint defined by the connection of the first frame member and the second frame member, wherein the puzzle joint extends between the first slot and the second slot.

2. The interconnect board frame of claim 1, further comprising a retention feature disposed on the first frame member and the second frame member, wherein the retention feature secures the first frame member with the second frame member in all directions.

3. The interconnect board frame of claim 2, wherein the retention feature includes a snap connector connected to the first frame member and a hole disposed in the second frame member, wherein the snap connector is disposed within the hole.

4. The interconnect board frame of claim 1, wherein the interconnect board frame has a length and a width, and the puzzle joint extends across the width.

5. The interconnect board frame of claim 1, wherein the puzzle joint includes a first crosswise portion connected to a lengthwise portion connected to a second crosswise portion, wherein the first crosswise portion is adjacent the first slot, the second crosswise portion is adjacent the second slot, and the lengthwise portion is disposed between the first slot and the second slot.

6. The interconnect board frame of claim 5, wherein the lengthwise portion is perpendicular to the first crosswise portion and the second crosswise portion.

7. The interconnect board frame of claim 1, wherein the puzzle joint is separated from the first slot and the second slot.

8. The interconnect board frame of claim 1, wherein the first slot includes a first window extending therethrough, and the second slot includes a second window extending therethrough.

9. The interconnect board frame of claim 1, wherein the first slot is offset along a width from the second slot.

10. A battery module comprising:
a first battery cell having a positive terminal and a negative terminal;
an interconnect board (ICB) frame disposed on the first battery cell, the ICB frame comprising:
a first frame member defining a first slot aligned with the positive terminal of the first battery cell;
a second frame member connected to the first frame member, the second frame member defining a second slot aligned with the negative terminal of the first battery cell; and
a puzzle joint defined by the connection of the first frame member and the second frame member, wherein the puzzle joint extends between the first slot and the second slot.

11. The battery module of claim 10, further comprising a plurality of busbars, wherein each of the plurality of busbars is disposed within one of the first slot and the second slot.

12. The battery module of claim 11, wherein the first slot includes a first window extending therethrough, and the second slot includes a second window extending therethrough, and the busbars are connected to the positive terminal and the negative terminal through the first window and the second window.

13. The battery module of claim 10, further comprising a retention feature disposed on the first frame member and the second frame member, wherein the retention feature secures the first frame member with the second frame member in all directions.

14. The battery module of claim 13, wherein the retention feature includes a snap connector connected to one of the first frame member and the second frame member and a hole disposed in the other of the first frame member and the second frame member, wherein the snap connector is disposed within the hole.

15. The battery module of claim 10, wherein the puzzle joint includes a first crosswise portion connected to a lengthwise portion connected to a second crosswise portion, wherein the first crosswise portion is adjacent the first slot, the second crosswise portion is adjacent the second slot, and the lengthwise portion is disposed between the first slot and the second slot.

16. The battery module of claim 15, wherein the lengthwise portion is perpendicular to the first crosswise portion and the second crosswise portion.

17. A battery module for a vehicle, the battery module comprising:
a plurality of battery cells
a plurality of busbars connected to the plurality of battery cells, wherein the battery cells are connected in series by the plurality of busbars;
an interconnect board (ICB) frame disposed between the plurality of battery cells and the plurality of busbars, the ICB frame comprising:
a first frame member defining a plurality of first slots aligned with positive terminals or negative terminals of the plurality of battery cells;
a second frame member connected to the first frame member, the second frame member defining a plurality of second slots aligned with the positive terminal or negative terminals of the plurality of battery cells; and
wherein the first frame connects to the second frame member across one of the series connections between the plurality of battery cells.

18. The battery module of claim 17, wherein the plurality of first slots and the plurality of second slots are each disposed in two rows along a length of the ICB frame.

19. The battery module of claim 17, further comprising a retention feature disposed on the first frame member and the second frame member, wherein the retention feature secures the first frame member with the second frame member in all directions.

20. The battery module of claim 19, wherein the retention feature includes a snap connector connected to one of the first frame member and the second frame member and a hole disposed in the other of the first frame member and the second frame member, wherein the snap connector is disposed within the hole.

* * * * *